(12) United States Patent
Zhang et al.

(10) Patent No.: US 12,140,441 B2
(45) Date of Patent: Nov. 12, 2024

(54) STATION RECOMMENDATION

(71) Applicant: BEIJING BAIDU NETCOM SCIENCE TECHNOLOGY CO., LTD., Beijing (CN)

(72) Inventors: Weijia Zhang, Beijing (CN); Hao Liu, Beijing (CN); Dejing Dou, Beijing (CN); Hui Xiong, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 487 days.

(21) Appl. No.: 17/531,529

(22) Filed: Nov. 19, 2021

(65) Prior Publication Data
US 2022/0082397 A1 Mar. 17, 2022

(30) Foreign Application Priority Data
Dec. 25, 2020 (CN) .......................... 202011566349.3

(51) Int. Cl.
*G01C 21/34* (2006.01)
*G06N 20/00* (2019.01)
(Continued)

(52) U.S. Cl.
CPC ..... *G01C 21/3476* (2013.01); *G01C 21/3484* (2013.01); *G06N 20/00* (2019.01); *G06Q 30/0631* (2013.01); *H04L 67/12* (2013.01)

(58) Field of Classification Search
CPC . G01C 21/3476; G01C 21/3484; H04L 67/12; G06N 20/00; G06Q 30/0631
See application file for complete search history.

(56) References Cited

U.S. PATENT DOCUMENTS 11,790,392 B2 * 10/2023 Hu ................... G06Q 30/0207
705/26.9
2012/0268061 A1 * 10/2012 Bhageria ................. B60L 53/65
320/107
(Continued)

FOREIGN PATENT DOCUMENTS

CN 107150603 A 9/2017
CN 111291920 A 6/2020
(Continued)

*Primary Examiner* — Anil K Bhargava
(74) *Attorney, Agent, or Firm* — Leydig, Voit & Mayer, Ltd.

(57) ABSTRACT

A method for recommending a station for a vehicle, a device, and a storage medium are provided. The method comprises: receiving, by a server, an access request from a vehicle; obtaining, based on the access request, a plurality of observation values from a plurality of stations associated with the vehicle, respectively, each observation value is based on a corresponding pre-trained recommendation model, each observation value includes factors associated with access of the vehicle to the station corresponding to the observation value; determining, an action value for the station based on the observation value and the pre-trained recommendation model for the station, the action value for the station indicates a matching degree between the access request and the station; determining a recommended station among the plurality of stations based on the action values of the plurality of stations; and sending to the vehicle an instruction of driving to the recommended station.

18 Claims, 6 Drawing Sheets

(51) Int. Cl.
*G06Q 30/0601* (2023.01)
*H04L 67/12* (2022.01)

(56) References Cited

U.S. PATENT DOCUMENTS

| | | | | |
|---|---|---|---|---|
| 2013/0226441 | A1* | 8/2013 | Horita | G01C 21/3469 |
| | | | | 701/117 |
| 2014/0142770 | A1* | 5/2014 | Sellschopp | B60L 58/12 |
| | | | | 700/291 |
| 2016/0075248 | A1* | 3/2016 | Jeong | G06Q 50/06 |
| | | | | 320/162 |
| 2018/0244167 | A1* | 8/2018 | Penilla | G06F 9/451 |
| 2019/0061541 | A1* | 2/2019 | Penilla | H04L 67/303 |
| 2019/0139162 | A1* | 5/2019 | Sawada | B60L 53/60 |
| 2019/0275892 | A1* | 9/2019 | Williams | B60L 53/63 |
| 2020/0175614 | A1* | 6/2020 | Fox | B60L 53/14 |
| 2020/0217679 | A1* | 7/2020 | DeLuca | G01C 21/3484 |
| 2020/0294078 | A1* | 9/2020 | Hu | G06Q 30/0237 |
| 2021/0048302 | A1* | 2/2021 | Maeda | B60L 58/12 |
| 2021/0078434 | A1* | 3/2021 | Goei | B60L 53/665 |
| 2021/0310819 | A1* | 10/2021 | Zhang | G01C 21/3484 |
| 2022/0036891 | A1* | 2/2022 | Zweig | G16H 50/30 |
| 2022/0089056 | A1* | 3/2022 | Rajmohan | B60L 53/66 |
| 2024/0123859 | A1* | 4/2024 | Yang | B60L 53/665 |

FOREIGN PATENT DOCUMENTS

| | | |
|---|---|---|
| CN | 111492386 A | 8/2020 |
| CN | 111523722 A | 8/2020 |
| CN | 111860228 A | 10/2020 |

* cited by examiner

STATION RECOMMENDATION

CROSS-REFERENCE TO RELATED APPLICATIONS

This application claims priority to Chinese Patent Application No. 202011566349.3, filed on Dec. 25, 2020, the contents of which are hereby incorporated by reference in their entirety for all purposes.

TECHNICAL FIELD

The present disclosure generally relates to the field of intelligent driving, more particularly relates to a method and apparatus for recommending a station for a vehicle, an electronic device, and a computer-readable storage medium.

BACKGROUND

In the field of driving, vehicles need energy replenishment during driving. For a fuel vehicle powered by gasoline or diesel, the vehicle needs to be driven to a nearby gas station for refueling when the oil quantity is small. For an electric vehicle powered by electric energy, the vehicle also needs to be driven to a nearby charging station to be charged when the electric quantity is insufficient. The endurance mileage of the electric vehicle is relatively short, so the demand for charging the electric vehicle is more urgent as compared with the fuel vehicle. How to enable a vehicle to access a station efficiently for energy replenishment, so as to achieve overall improvement of access efficiency, is a goal that a designer expects to achieve.

SUMMARY

The present disclosure provides a method, an electronic device, and a computer-readable storage medium.

According to an aspect of the present disclosure, a method for recommending a station for a vehicle is provided. The method includes: receiving, by a server, an access request from a vehicle; obtaining, by the server based on the access request, a plurality of observation values from a plurality of stations associated with the vehicle, respectively, each observation value is based on a corresponding pre-trained recommendation model, and each observation value comprises factors associated with access of the vehicle to the station corresponding to the observation value; determining, by the server, for each station of the plurality of stations, an action value for the station based on the observation value and the corresponding pre-trained recommendation model for the station, the action value for the station indicates a matching degree between the access request and the station; determining, by the server, a recommended station among the plurality of stations based on the action values of the plurality of stations; and sending, by the server to the vehicle, an instruction of driving to the recommended station.

According to another aspect of the present disclosure, an electronic device is provided. The apparatus includes: at least one processor; and a memory in communication connection with the at least one processor. The memory stores instructions executable by the at least one processor to enable the at least one processor to: receive an access request from a vehicle; obtain, based on the access request, a plurality of observation values from a plurality of stations associated with the vehicle, respectively, each observation value is based on a corresponding pre-trained recommendation model, and each observation value comprises factors associated with access of the vehicle to the station corresponding to the observation value; determine, for each station of the plurality of stations, an action value for the station based on the observation value and the corresponding pre-trained recommendation model for the station, the action value indicates a matching degree between the access request and the station; determine a recommended station among the plurality of stations based on the action values of the plurality of stations; and send to the vehicle an instruction of driving to the recommended station.

According to another aspect of the present disclosure, a non-transitory computer readable storage medium is provided. The non-transitory computer readable storage medium stores computer instructions, the computer instructions are configured to cause a computer to: receive an access request from a vehicle; obtain, based on the access request, a plurality of observation values from a plurality of stations associated with the vehicle, respectively, each observation value is based on a corresponding pre-trained recommendation model, and each observation value comprises factors associated with access of the vehicle to the station corresponding to the observation value; determine, for each station of the plurality of stations, an action value for the station based on the observation value and the corresponding pre-trained recommendation model for the station, the action value indicates a matching degree between the access request and the station; determine a recommended station among the plurality of stations based on the action values of the plurality of stations; and send to the vehicle an instruction of driving to the recommended station. It should be understood that the content described in this section is neither intended to identify key or important features of embodiments of the present disclosure, nor intended to limit the scope of the present disclosure. Other features of the present disclosure will become easy to understand based on the following description.

BRIEF DESCRIPTION OF THE DRAWINGS

The accompanying drawings are used to better understand the solution, and do not limit the present application. In the accompanying drawings.

DETAILED DESCRIPTION OF THE EMBODIMENTS

Exemplary embodiments of the present application are described hereinafter in conjunction with the accompanying drawings, wherein various details of the embodiments of the present application are included to facilitate understanding, and should be regarded as merely exemplary. Therefore, those of ordinary skill in the art should appreciate that various changes and modifications can be made to the embodiments described herein without departing from the scope and spirit of the present application. Also, for clarity and conciseness, description of well-known functions and structures is omitted in the following description.

When a user needs to replenish energy for a vehicle, the user sends a request to a server with an expectation of obtaining an optimized recommendation from the server. In an existing station recommendation solution, a server often simply recommends a station closest to the vehicle for the vehicle, or recommends a station that can be reached with the shortest traveling time for the vehicle based on current road conditions. This solution only focuses on a single request of a single vehicle, but ignores conditions of other station in an entire station network and other vehicles with similar needs.

However, conditions of different vehicles and different stations vary greatly in different time and spaces. For example, for different road conditions of a vehicle or for different queue conditions of vehicles to be replenished with energy in a station, station recommendation strategies for the vehicle are different. In addition, due to the strong correlation between recommendation solutions for different vehicles in a certain space, if only the single request is considered, the entire station network is subject to local optimization, while the overall optimization efficiency of the network cannot be achieved.

In view of the above problems, embodiments of the present disclosure provide a solution for recommending a station for a vehicle. The embodiments of the present disclosure will be described specifically below in conjunction with FIGS. 1 to 6.

When a station is recommended in the present application, information of a plurality of stations in an environment is associated and shared, and different conditions of different stations are comprehensively considered, and thus a station recommendation solution is optimized from a long-term and global perspective.

Figure 1:
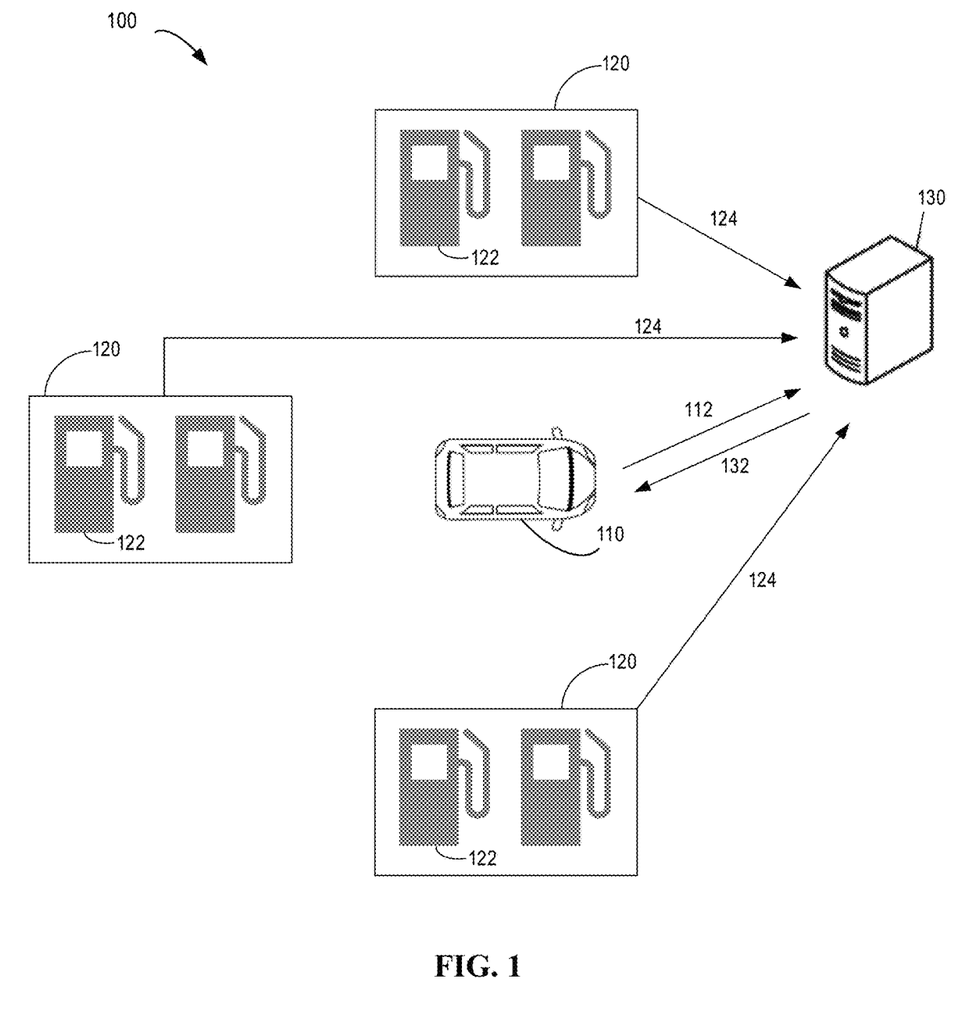
FIG. 1 shows a schematic diagram of an example environment in which multiple embodiments of the present disclosure may be implemented.

FIG. 1 shows a schematic diagram of an example environment 100 in which multiple embodiments of the present disclosure may be implemented. The implementations of the present disclosure will be described below in conjunction with a scenario in which a charging station is recommended for an electric vehicle to charge the electric vehicle. However, it should be understood that such description is merely illustrative. The implementations of the present disclosure may also be used in other scenarios in which a gas station is recommended for a fuel vehicle to refuel the fuel vehicle, etc. The specific scenarios are not limited by the implementations of the present disclosure.

As shown in FIG. 1, in an environment 100, a vehicle 110 is on a certain site. For example, the vehicle 110 may travel on a road in a traffic network or be parked in a parking lot. In the environment of FIG. 1, the vehicle 110 needs to be replenished with energy.

In the context of the present disclosure, the term "vehicle" may take various forms. The vehicle 110 may be an electric vehicle or a fuel vehicle, and may also be a vehicle with hybrid power. In some embodiments, the vehicle 110 may be a sedan, a truck, a trailer, a motorcycle, a bus, or the like. In some embodiments, the vehicle 110 may take the form of, for example, a vessel, an aircraft, a helicopter, a train, an agricultural vehicle, a recreational vehicle, a construction vehicle or the like. In some embodiments, the vehicle 110 may be a domestic vehicle, a passenger vehicle having a commercial nature, a freight vehicle having a commercial nature, or the like. In some embodiments, the vehicle 110 may be a vehicle with an autonomous parking capability, wherein an automatic driving capability may include, but not limited to, an assisted driving capability, semi-automatic driving capability, highly automatic driving capability or fully automatic driving capability.

As shown in FIG. 1, the environment 100 includes stations 120. In the context of the present disclosure, the term "station" may take various forms. The station 120 includes a plurality of access points 122 to replenish energy for the vehicle 110. In some embodiments, the station 120 may be a charging station in which a plurality of charging piles are provided to charge electric vehicles. In some other embodiments, the station 120 may also be a gas station in which a plurality of fuel nozzles are provided to provide a refueling service for fuel vehicles. The station 120 may be provided in a road network with a large traffic flow, for example, near an urban road or expressway, or in a road network with a small traffic flow, for example, near a rural road. The specific form of the station 120 is not limited by the embodiments of the present disclosure.

As shown in FIG. 1, the environment 100 includes a server 130. The vehicle 110 may send an access request 112 to the server 130 when energy replenishment is needed, in expectation of obtaining a recommendation about a station 120 from the server 130. In the context where the vehicle 110 is an electric vehicle, the access request 112 is a charging request sent by the electric vehicle to the server 130. The server 130 communicates with the vehicle 110, so that the access request 112 can be known and processed in time. The server 130 may also communicate with the plurality of stations 120 in the environment 100 to obtain information such as geographic location and the number of charging piles of the corresponding stations 120, which facilitates recommending a suitable station 120 for the vehicle 110 for the access request 112 according to the information of the stations 120. The server 130 may perform training based on a machine learning model according to various data of a pre-trained historical recommendation data set, to make a recommendation for the vehicle 110. The server 130 may perform a process described herein with reference to FIG. 2, so that the recommendation of the station 120 is more accurate.

Figure 2:
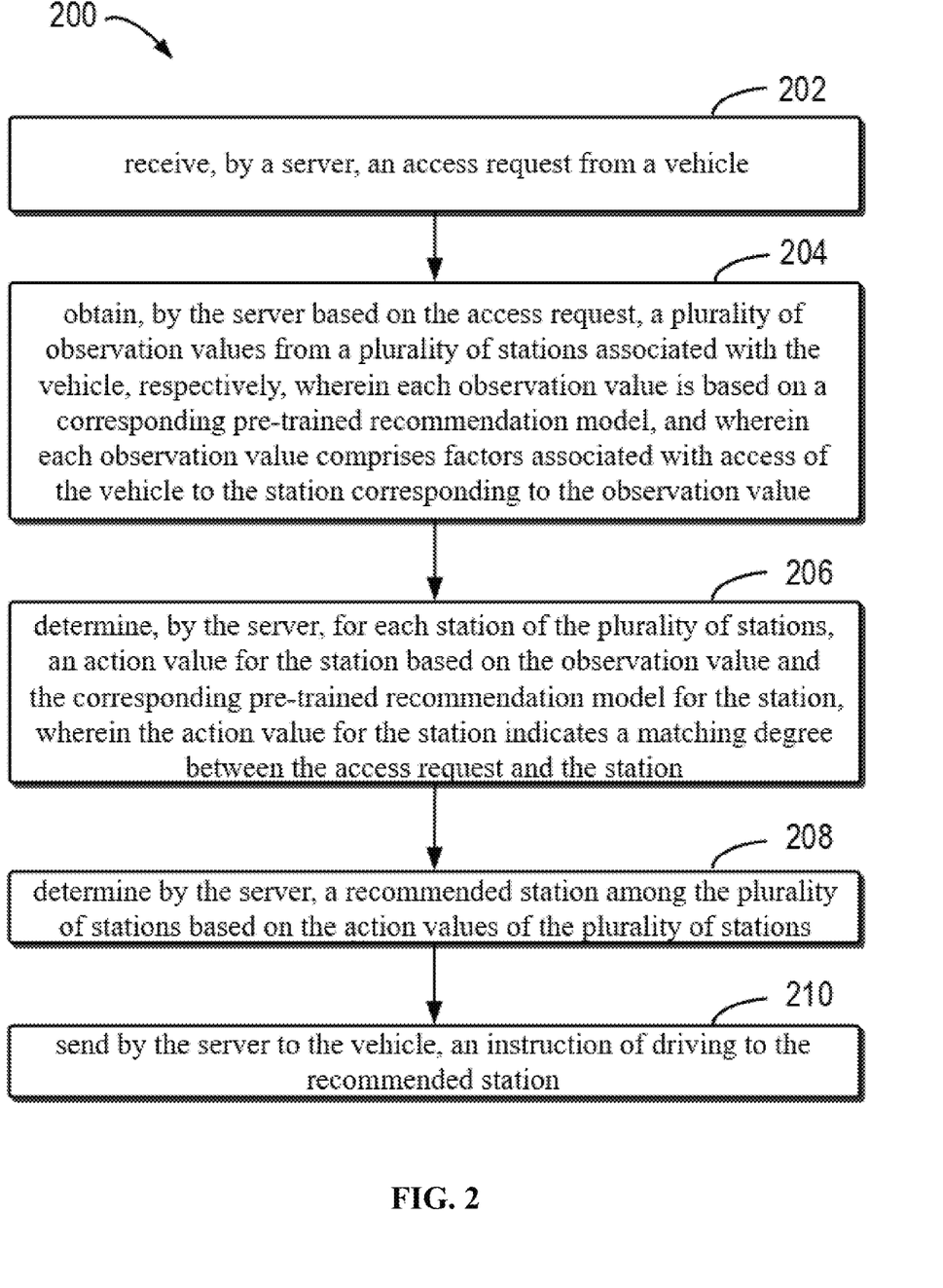
FIG. 2 shows a flow diagram of a method for recommending a station for a vehicle according to some implementations of the present disclosure.

FIG. 2 shows a flow diagram of a method 200 for recommending a station 120 for a vehicle 110 according to some implementations of the present disclosure. The method 200 may be performed by various types of computing devices in a server 130.

In block 202, an access request 112 from the vehicle 110 is received. In some embodiments, the access request 112 may be sent by a person on the vehicle 110 through a terminal device on the vehicle 110. In some embodiments, the terminal device may be a mobile phone, a tablet computer, a vehicle-mounted navigation device loaded with a navigation application, or the like. The person on the vehicle 110 may send the access request 112 to the server 130 by searching for nearby charging stations or gas stations on the navigation application. In some embodiments, if the vehicle 110 is an unmanned autonomous vehicle, the vehicle 110 may autonomously send the access request 112 to the server 130 based on a remaining electric or oil quantity thereof.

In block 204, for the received access request 112, the server 130 obtains a corresponding observation value of a pre-trained recommendation model from each station 120 of a plurality of stations 120 associated with the vehicle 110. The observation value at least comprises factors associated with access of the vehicle 110 to the corresponding station 120. The observation value is an input to the recommendation model, and the recommendation model will make recommendation decisions based on the observation value.

In conjunction with FIG. 1, the observation value may be sent from the stations 120 to the server 130 through channels 124. In some embodiments, these factors may include the number of vacant access point(s) 122 for the corresponding station 120. For example, in the case where the station 120 is a charging station, these factors may be the number of vacant charging pile(s) in the charging station. In other embodiments, these factors may also include access efficiency of the stations 120, for example. For example, in the case where the station 120 is a charging station, the access efficiency may be charging efficiency of a charging pile in the charging station. The observation value may also be sent from the vehicle 110 to the server 130.

In some embodiments, these factors may include, for example, corresponding predicted driving time from the location of the vehicle 110 where the access request 112 is sent, to each station 120. The driving time here may be determined based on the location of the station 120, a current location of the vehicle 110, and road conditions between the station 120 and the vehicle 110. In other embodiments, these factors may also include current time. It should be understood that the examples of the observation value listed here is only illustrative, and the observation value may include other factors, so long as the factors are related with whether the vehicle 110 is suitable for being driven to the station 120 for access.

In some embodiments, the plurality of stations 120 may be stations within a first distance threshold from the vehicle 110. These stations 120 are relatively close to the current location of the vehicle 110, and thus are strongly related with a station recommendation solution for the vehicle 110.

In block 206, based on the corresponding observation value and the pre-trained recommendation model, a corresponding action value for each station 120 is determined. The action value is an output about the observation value from the recommendation model. The action value is used to indicate a matching degree between the access request 112 and the corresponding station 120. In some embodiments, the higher the matching degree is, the higher the corresponding action value may be.

In block 208, a station 120 recommended for the vehicle 110 in the current environment is determined based on action values corresponding to the plurality of stations 120. In some embodiments, a station with the largest action value may be selected from the stations 120 as the recommended station.

In block 210, an instruction 132 of driving to the recommended station 120 is sent to the vehicle 110. In some embodiments, if the person on the vehicle 110 performs the operation through the navigation application, the server 130 sends the instruction 132 to the person on the vehicle 110 through a prompt on the navigation application, so as to inform the person about which station 120 he should drive to. In this case, the person on the vehicle 110 may drive to the recommended station 120 according to a path recommendation of the navigation application, and may also personally select a route to the recommended station 120 according to his own judgment. This is not limited in the present application. In some embodiments, if the vehicle 110 is an unmanned autonomous vehicle, the server 130 sends the instruction 132 to a central control system of the vehicle 110, and the vehicle 110 autonomously chooses a suitable route to the recommended station 120 according to current traffic conditions.

According to the embodiments of the present disclosure, after receiving the access request 112 from the vehicle 110, the server 130 may recommend the most suitable station 120 for the vehicle 110 based on conditions of the vehicle 110 and the plurality of stations 120 associated therewith, in comprehensive consideration of current conditions of these stations 120.

In some embodiments, different stations 120 may share the same recommendation model, and differences between the different stations 120 are reflected in different observation values of the stations 120. In this case, after a certain station 120 learns once, the recommendation model will be updated, and the updated recommendation model will be applicable to all the stations 120 in the environment 100. Of course, in other embodiments, training may also be performed for each station 120 in an individualized manner. In this way, updates and iterations of the recommendation model are only related with the station 120 itself.

In some embodiments, the recommendation model may be trained based on a historical recommendation and a reward value related to the historical recommendation, wherein the reward value may be a measure for evaluating an acceptance degree of the historical recommendation. The reward value may be determined based on evaluation elements in the recommendation solution for a user.

For example, when a user considers that waiting time is the most important evaluation element for evaluating a recommendation solution, the reward value may be determined based on the waiting time. In this case, for a certain recommendation solution, the reward value for the recommendation solution may be determined based on the access waiting time of the recommended station 120 in the solution, which will be described below. It may be understood that in the case where the station 120 is a charging station, the access waiting time may be regarded as charging waiting time.

It should be understood that using the access waiting time as the reward value as mentioned above is only one of feasible solutions. In other embodiments, other factors may also be used as the reward value of the recommendation solution.

For example, in some embodiments, if the expense of charging by using the recommendation solution is high, it indicates that the fee charging of the recommended station 120 may be unreasonable, and accordingly, a lower reward value may be assigned to the recommendation solution. In some other embodiments, if the vehicle 110 is an electric vehicle of a certain brand, and after the vehicle 110 is accessed and charged, it is found that a charging pile of the station 120 cannot charge the vehicle of this brand well, a lower reward value may also be assigned to the recommendation solution. In some other embodiments, if it is found that after the vehicle 110 is accessed and charged, the charging performance of the station 120 is not good, which may cause a bad influence on a battery of the vehicle 110, a lower reward value may also be assigned to the recommendation solution. Inversely, in other embodiments, if it is found that the service experience of the station 120 is good after the vehicle 110 is accessed and charged, a higher reward value may be assigned to the recommendation solution. In some embodiments, such a reward value may be determined based on a score value, provided by the vehicle 110, of the experience of the recommendation. In some embodiments, various evaluation factors may also be considered comprehensively to obtain a final reasonable reward value.

In this way, based on observation values, action values and corresponding reward values of historical recommendation solutions, the recommendation model may continuously optimize its recommendation strategy through repeated learning iterations. An output result of a neural network model becomes more accurate as the number of training samples increases, and thus model data that can be used for training becomes more abundant as the number of access requests 112 processed by the server 130 increases. In this way, the recommendation model is updated such that future station recommendations are more reasonable.

In some embodiments, after a certain access request 112 is successfully processed (that is, the vehicle 110 that sends the access request 112 accesses the recommended station 120 according to the recommendation of the server 130), an observation value as a training sample may include an observation value at a time point when the next access request 112 is received after the processing. For example, an access request 112 appears at a time point T1 and is processed at another time point T2, that is, the vehicle 110 accesses the recommended station 120 at the time point T2. If a first new access request 112 appears at yet another time point T3 immediately after the time point T2, an observation value corresponding to the time point T3 is also used as a training value sample for the access request 112.

Figure 3:
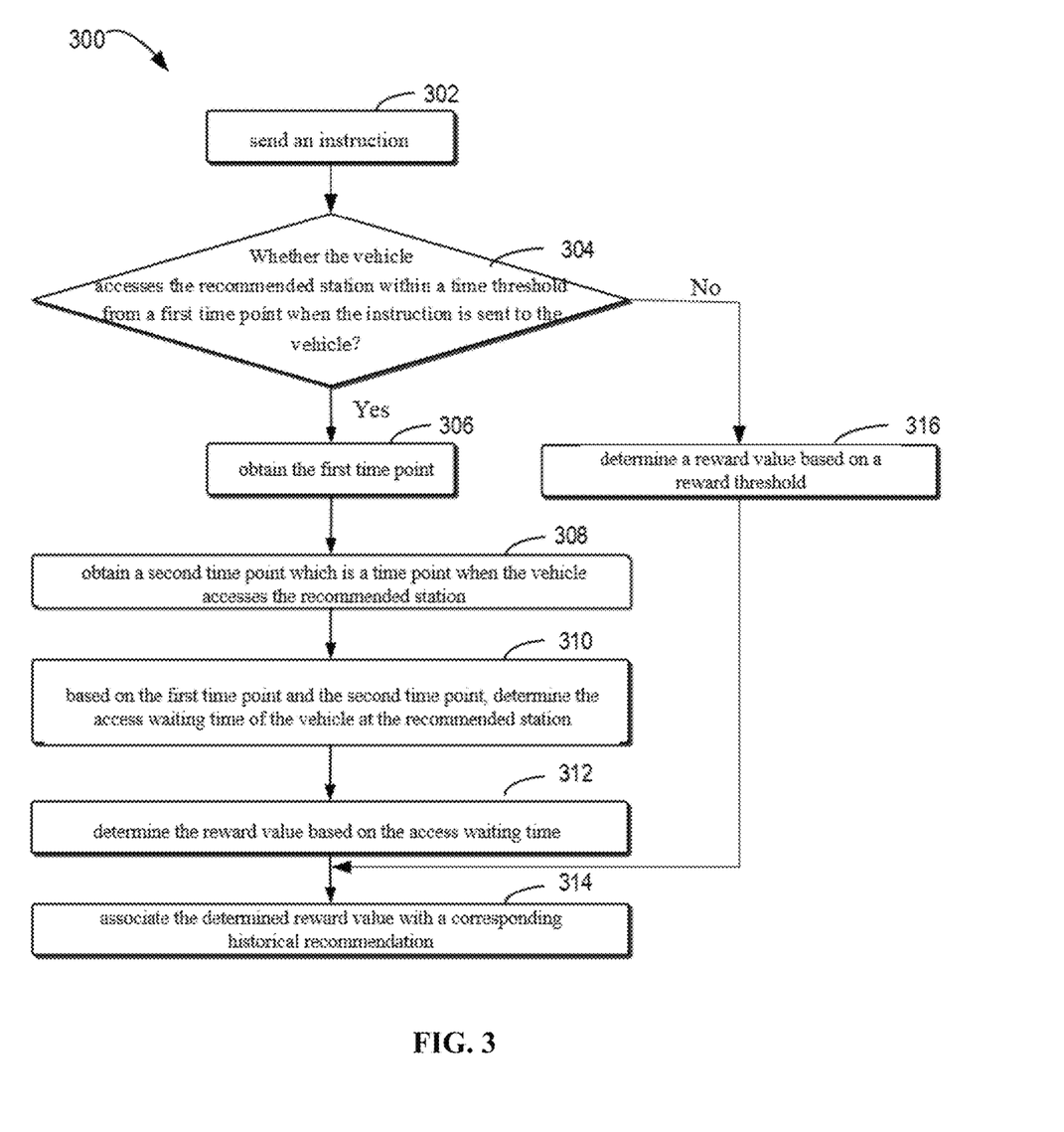
FIG. 3 shows a flow diagram of a method for determining a reward value according to some implementations of the present disclosure.

The following description is made with reference to FIG. 3. FIG. 3 shows a flow diagram of a method 300 for determining a reward value according to some implementations of the present disclosure. As shown in FIG. 3, in block 302, an instruction 132 for a recommended station 120 is sent to a vehicle 110 by a server 130. In block 304, the server 130 may determine whether the vehicle 110 accesses the station 120 recommended by the server 130 within a certain time threshold from a first time point when the instruction 132 is sent to the vehicle 110. In some embodiments, the time threshold may be 45 minutes. Of course, it should be understood that the numerical value here is only illustrative, and the corresponding time threshold may be determined according to different requirements.

If a returned value is "yes", it indicates that the vehicle 110 finally adopts the solution recommended by the server 130, which means that the solution is generally acceptable to a user. In this case, a reward value may be assigned to the solution based on access waiting time. In conjunction with FIG. 3, in block 306, the first time point is obtained. In block 308, the server 130 obtains a time point when the vehicle 110 accesses the recommended station 120. In block 310, based on the obtained first time point and second time point, access waiting time of the vehicle 110 at the recommended station 120 is obtained. In some embodiments, the access waiting time may be determined by the difference between the first time point and the second time point.

In block 312, based on the determined access waiting time, a corresponding reward value of the recommendation solution is obtained. In some embodiments, a negative value of access waiting time in a certain recommendation solution may be used as a reward value of the solution. This means that the longer the access waiting time is, the smaller the reward value is. If the access waiting time is very short, it indicates that the vehicle 110 takes a small amount of time to access the station 120. In this case, the recommendation solution is highly desirable, and a larger reward value may be assigned thereto. If the access waiting time is too long, the recommendation solution is less desirable, so a smaller reward value is applied to the recommendation solution, thereby imposing a certain degree of punishment on the solution.

In block 314, the determined reward value is associated with a corresponding historical recommendation. In this way, training samples of the server 130 may be expanded to facilitate learning by the server 130, thereby obtaining a more reasonable recommendation solution.

Still referring to FIG. 3, if a determination result at block 304 is "No", it means that the vehicle 110 does not adopt the solution recommended by the server 130 within the time threshold. This may be because the recommended station 120 does not have an access point that matches the model of the vehicle 110 or the recommended station 120 is difficult to go to, or the like. In short, if the returned value is "No", it means that such a recommendation solution is completely undesirable for the user, so a lower reward value for evaluation needs to be provided. Referring to FIG. 3, in block 316, the reward value may be determined based on a certain reward threshold. For example, a reward threshold of −60 may be applied to the reward value. It should be understood that the numerical value of the reward threshold here is only illustrative and not restrictive. An appropriate reward threshold may be applied to the reward value based on actual conditions of different stations 120.

According to the embodiments of the present disclosure, with the access waiting time as a target, the station recommendation solution is progressively optimized through continuously reinforced learning of the server 130.

In some embodiments, when obtaining an observation value of a certain station 120, the server 130 considers not only factors of the station 120 itself, but also factors of other stations around the station 120. In this way, through comprehensive consideration of the plurality of stations 120 in the environment 100, the solution provided by the server 130 can achieve overall consideration of observation values of the stations 120 in a system.

In some implementations, an observation value of a station 120 suitable for model training may include a first observation value for the station 120, and second observation values for other stations 120 within a certain distance threshold from the station 120. In some embodiments, the second observation values may be observation values associated with the other stations 120 themselves, and the observation value does not include observation values of factors of still other stations related with the other stations 120.

Figure 4:
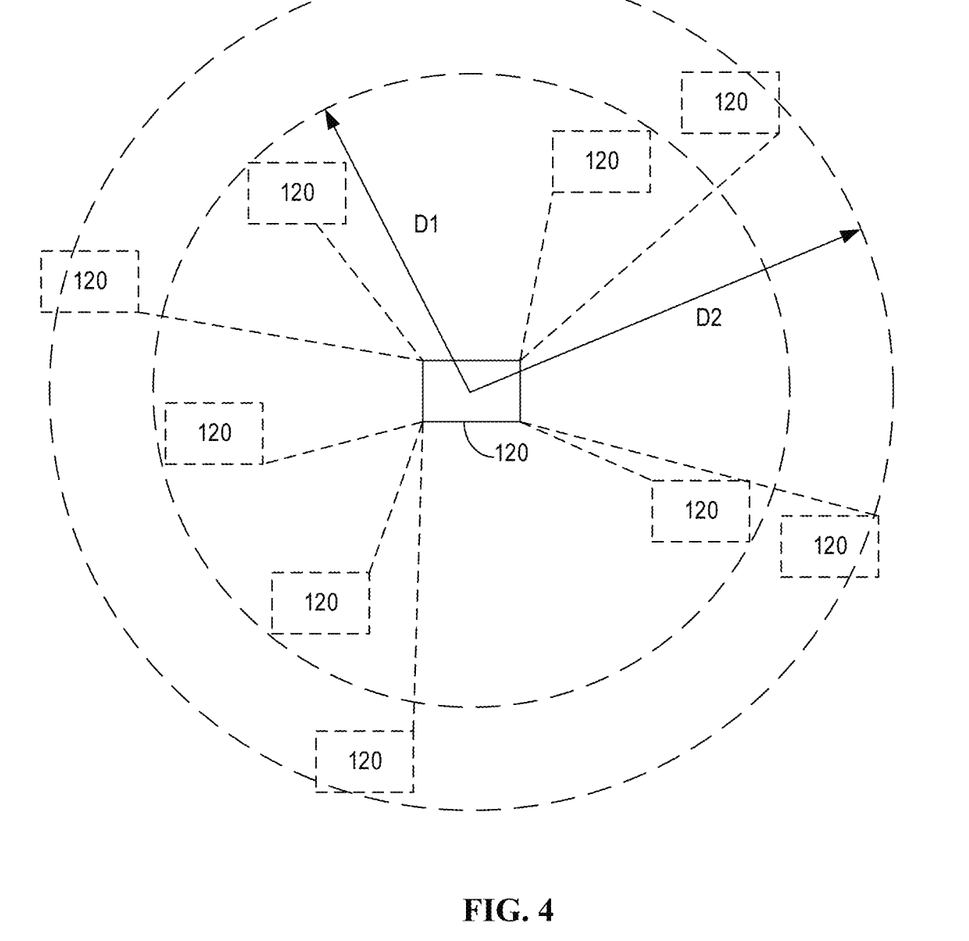
FIG. 4 shows a schematic diagram for determining an observation value of a station according to an exemplary implementation of the present disclosure.

A schematic diagram for determining an observation value of a station 120 according to an exemplary implementation of the present disclosure is described below in conjunction with FIG. 4. In FIG. 4, the station 120 located in the center may be any of the stations in FIG. 1. Through a process described below in conjunction with FIG. 4, the observation values received from the stations 120 by the server 130 may be optimized.

In some implementations, corresponding weights may be assigned to different second observation values according to degrees of association between the stations around the station 120 and the station 120.

An illustrative method capable of implementing information sharing between a plurality of stations 120 is described below based on a formula (1). A spatial graph G may be used to describe the association of the plurality of stations 120. This spatial graph G may be represented by G=(V, E, A), where V is a set of the stations 120, E is a set of edges in the spatial graph, and A represents an adjacency matrix.

In some illustrative implementations, elements $\alpha_{ij}$ in the adjacency matrix A satisfy the following relationship:

$$\alpha_{ij} = \begin{cases} \exp\left(-\left(\frac{d_{ij}}{\sigma}\right)^2\right), & d_{ij} \leq \beta, i \neq j \\ 0, & \text{others} \end{cases} \quad (1)$$

where $d_{ij}$ represents the distance between different stations 120 in a road network, and $\beta$ represents the distance threshold.

According to the above formula (1), $\alpha$ is not 0 only when $d_{ij}$ is within a certain distance threshold $\beta$. This indicates that when the distance between two stations 120 meets a certain condition, observation values of the two stations 120 are considered mutually.

In addition, under the condition of $d_{ij} \leq \beta$, the value of $\alpha_{ij}$ decreases as $d_{ij}$ increases, which means that the farther the distance from the current station 120 is, the smaller the weight obtained thereof is.

After $\alpha_{ij}$ is obtained, observation values $x_t^{i,l}$ of other stations 120 related to the station 120 (the station 120 located in the center in FIG. 3) may be obtained based on the following formula (2).

$$x_t^{i,l} = ReLU\left(W^l\left(\sum_{j \in N_i} \alpha_{ij} x_t^{j,l-1} + I(l > 1) x_t^{j,l-1}\right)\right) \quad (2)$$

where $N_i$ is a station set associated with the station 120 in the spatial graph G, l represents a graph convolution operation for the $l^{th}$ time, and I(l>1) is an indicator function, wherein if l>1, the indicator function I(l>1) is 1, otherwise the indicator function is 0. The function ReLU is a rectified linear function applicable to an artificial neural network, and $\alpha_{ij}$ may be calculated according to the formula (1).

By using the function ReLU of the formula (2), when l is determined to be $l_1$, the server 130 may determine associated observation values $x_t^{i,l_1}$ of a plurality of stations 120 within a certain distance threshold D1 from the station 120. By adjusting l, when l is determined to be $l_2$, the server 130 may determine associated observation values $x_t^{i,l_2}$ of another plurality of stations 120 within another distance threshold D2 from the station 120. By splicing the pluralities of associated observation values under different distance thresholds, a set $x_t^{i,L}$ of observation values of the plurality of other stations 120 associated with the station 120 may be obtained.

Finally, the set is spliced with original observation values $o_t^i$ at the station 120 itself to obtain a final observation value $O_t^i$ at the station 120:

$$O_t^i = [o_t^i, x_t^{i,L}] \quad (3).$$

According to the formulas (2) and (3), a corresponding weight may be determined for each of second observation values of other stations within a certain distance threshold from the station 120, and the weight is related to the distance.

In this way, when an observation value of a certain station is considered, other stations spatially associated with the station are considered and corresponding weights are assigned thereto, so that the server 130 may conveniently provide a global optimization solution based on overall conditions.

It should be understood that the method of implementing data sharing between the plurality of stations 120 listed here is only illustrative and not restrictive. Those skilled in the art may use other functions than the function ReLU to achieve it according to specific requirements, so long as the method used can take factors of the stations around the station 120 into consideration of the observation value of the present station 120.

In the solution described above, the reward value may be determined based on the vehicle 110 arriving at the recommended station 120 for charging and calculating the access waiting time. This means that there are a plurality of reward values in the time span from sending the access request 112 to obtaining the access waiting time and to the next access request 112. In some embodiments, the server 130 may determine the reward value dynamically in consideration of a plurality of reward values in this time span.

A method for dynamically determining a reward value is described below based on a formula (4).

$$R_{t:t+j} = \sum_{T_t < T_{t'}^c \leq T_{t+j}} \gamma^{(T_{t'}^c - T_t - 1)} r(s_{t'}, t_{t'}) \quad (4)$$

where $R_{t:t+j}$ represents a comprehensive reward value R in a time span from t to t+j, $\gamma$ represents a discount factor, T represents a corresponding time point, and r represents a reward value based on a status of the station 120 and a corresponding action value thereof.

In some embodiments, $\gamma$ may be a real number between 0 and 1. Since $\gamma$ is less than 1, the larger the difference between the current time point $T_{t'}^c$ and the time point $T_t$ when the access request 112 is sent is, the smaller the value of $$\gamma^{(T_{t'}^c - T_t - 1)}$$

is. This means that for the reward value r obtained at the time point $T_{t'}^c$, if the time point $T_{t'}^c$ is temporally far from the time point $T_t$, a smaller weight is assigned to the reward value r. Similarly, if the time point $T_{t'}^c$ is temporally close to the time point $T_t$, the value of $$\gamma^{(T_{t'}^c - T_t - 1)}$$

is larger, which means that a larger weight is assigned to the corresponding reward value r.

In this way, in determination of the reward value of the corresponding solution, other reward values associated with the time point are comprehensively considered temporally, to facilitate the server 130 providing a solution that is more conducive to optimizing global efficiency.

Figure 5:
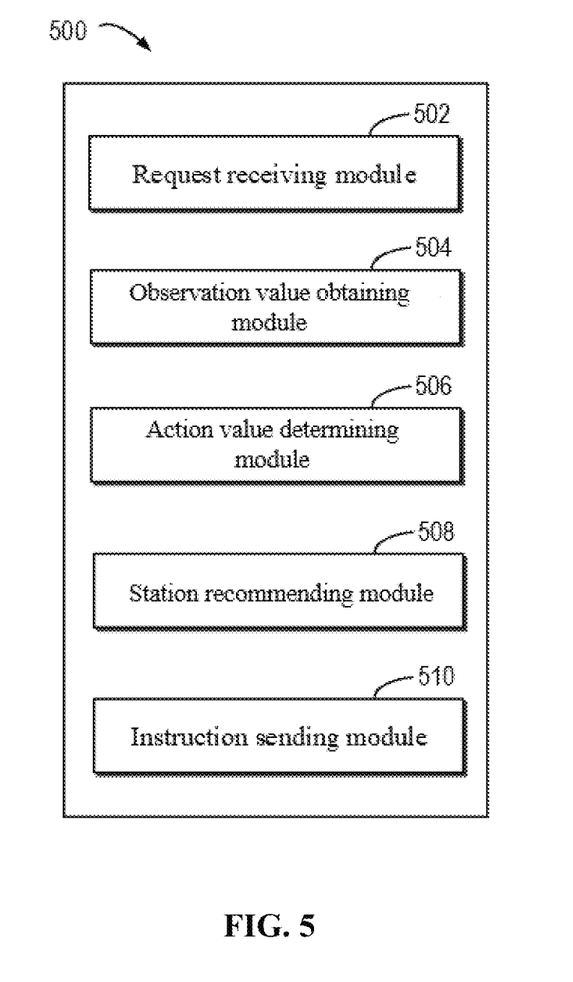
FIG. 5 shows a block diagram of an apparatus for recommending a station for a vehicle according to an exemplary implementation of the present disclosure.

FIG. 5 schematically shows a block diagram of an apparatus 500 for recommending a station 120 for a vehicle 110 according to an exemplary implementation of the present disclosure. Specifically, the apparatus 500 includes: a request receiving module 502 configured to receive, at a server 130, an access request 112 from a vehicle 110; an observation value obtaining module 504 configured to obtain, for the received access request 112, a corresponding observation value of a pre-trained recommendation model from each of a plurality of stations 120 associated with the vehicle 110, the corresponding observation value at least including factors associated with access of the vehicle 110 to the corresponding station 120; an action value determining module 506 configured to determine, based on the corresponding observation value and the pre-trained recommendation model, a corresponding action value for each station 120, the corresponding action value indicating a matching degree between the access request 112 and each corresponding station 120; a station recommending module 508 configured to determine a recommended station based on corresponding action values of the plurality of stations 120; and an instruction sending module 510 configured to send to the vehicle 110 an instruction 132 of driving to the recommended station 120.

In some embodiments, the pre-trained recommendation model is trained based on a historical recommendation and a reward value corresponding thereto.

In some embodiments, the reward value is determined based on one or more of: access waiting time of the vehicle at the recommended station, a reward threshold, expense of the vehicle at the recommended station, a matching degree between a model of the vehicle and an accessible model for the recommended station, a station access efficiency of the recommended station or a score of the recommended station provided by the vehicle.

In some embodiments, the apparatus 500 further includes: a reward value determining module configured to, in response to the vehicle accessing the recommended station within a time threshold starting from a first time point of sending the instruction to the vehicle, obtain the first time point; obtain a second time point, which is a time point when the vehicle accesses the recommended station; determine the access waiting time of the vehicle at the recommended station based on the first time point and the second time point; and determine the reward value based on the access waiting time.

In some embodiments, the apparatus 500 further includes: a reward value determining module configured to, in response to the vehicle not accessing the recommended station within the time threshold starting from the first time point of sending the instruction to the vehicle, determine the reward value based on the reward threshold.

In some embodiments, the plurality of stations are stations within a first distance threshold from the vehicle.

In some embodiments, the corresponding observation value includes a first observation value for the corresponding station, and second observation values for other stations within a second distance threshold from the corresponding station.

In some embodiments, obtaining the corresponding observation value of the pre-trained recommendation model includes: determining a corresponding weight for each of the second observation values.

In some embodiments, the reward value is determined based on the access waiting time and a reward value for a time point associated with the first time point.

In some embodiments, determining the recommended station includes: determining the corresponding action value of each of the plurality of stations; determining a largest action value from the corresponding action values; and determining a station corresponding to the largest action value as the recommended station.

In some embodiments, the corresponding observation value indicates: current time; the number of vacant access point(s) in the corresponding station; driving time from the location where the access request is sent, to the corresponding station; and/or access efficiency of the corresponding station.

Figure 6:
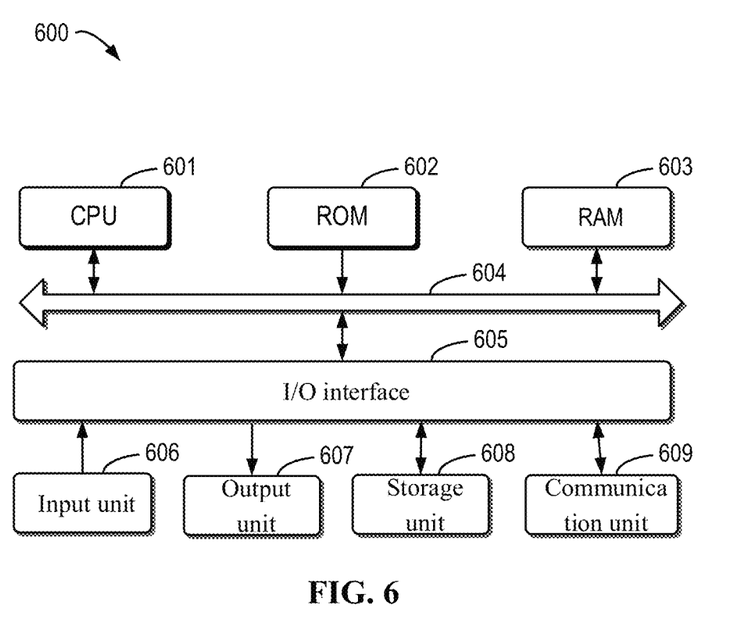
FIG. 6 shows a block diagram of a computing device capable of implementing multiple implementations of the present disclosure.

According to the embodiments of the present application, the present application further provides an electronic device, a readable storage medium, and a computer program product. FIG. 6 shows a schematic block diagram of an electronic device 600 capable of implementing multiple embodiments of the present disclosure.

As shown in FIG. 6, the electronic device 600 includes a central processing unit (CPU) 601, which can perform various appropriate actions and processing according to computer program instructions stored in a read-only memory (ROM) 602 or computer program instructions loaded into a random access memory (RAM) 603 from a storage unit 608. In the RAM 603, various programs and data required for the operation of the electronic device 600 may also be stored. The CPU 601, the ROM 602, and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard and a mouse; an output unit 607, such as various types of displays and speakers; and a storage unit 608, such as a magnetic disk or an optical disk; and a communication unit 609, such as a network card, a modem and a wireless communication transceiver. The communication unit 609 allows the electronic device 600 to exchange information/data with other devices through a computer network such as the Internet and/or various telecommunication networks.

The processes and processing described above, such as the methods 200 and 300, may be executed by the CPU 601. For example, in some embodiments, the methods 200 and 300 may be implemented as computer software programs, which are physically contained in a machine-readable medium, such as the storage unit 608. In some embodiments, part or all of the computer programs may be loaded and/or installed on the electronic device 600 via the ROM 602 and/or the communication unit 609. When the computer programs are loaded into the RAM 603 and executed by the CPU 601, one or more actions of the methods 200 and 300 described above may be executed.

The present disclosure may be a method, apparatus, system and/or computer program product. The computer program product may include a computer-readable storage medium loaded with computer-readable program instructions for executing various aspects of the present disclosure.

The computer-readable storage medium may be a physical device that can maintain and store instructions for use by an instruction execution device. The computer-readable storage medium may be, for example, but not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disc, a hard disc, an random access memory (RAM), a read only memory (ROM), an erasable programmable read only memory (EPROM or flash memory), a static random access memory (SRAM), a portable compact disk read-only memory (CD-ROM), a digital versatile disk (DVD), a memory stick, a floppy disk, a mechanical encoding device, a punched card or a convex structure in a groove, with instructions stored thereon, and any suitable combinations thereof. The computer-readable storage medium used here is not interpreted as a transient signal itself, such as a radio wave or other freely propagating electromagnetic wave, an electromagnetic wave propagating through a waveguide or other transmission medium (such as a light pulse through a fiber optic cable), or an electrical signal transmitted through an electric wire.

The computer-readable program instructions described here may be downloaded from the computer-readable storage medium to various computing/processing devices, or downloaded to an external computer or external storage device via a network such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcodes, firmware instructions, status setting data, or source code or object codes written in any combination of one or more programming languages, the programming languages including object-oriented programming languages such as Smalltalk and C++, etc. and conventional procedural programming languages such as "C" language or a similar programming language. The computer-readable program instructions may be executed entirely on a user's computer, partly on a user's computer, as an independent software package, partly on a user's computer and partly on a remote computer, or entirely on a remote computer or server. In the case where a remote computer is involved, the remote computer may be connected to a user's computer through any type of network, including a local area network (LAN) or a wide area network (WAN), or may be connected to an external computer (such as connection through the Internet from an Internet service provider). In some embodiments, an electronic circuit, such as a programmable logic circuit, a field programmable gate array (FPGA), or a programmable logic array (PLA), may be customized by using status information of the computer-readable program instructions, and the electronic circuit may execute the computer-readable program instructions to implement various aspects of the present disclosure.

The various aspects of the present disclosure are described here with reference to the flow diagrams and/or block diagrams of the method, apparatus (system) and computer program product according to the embodiments of the present application. It should be understood that each block of the flow diagrams and/or block diagrams, and combinations of blocks in the flow diagrams and/or block diagrams may be implemented by the computer-readable program instructions.

The computer-readable program instructions may be provided to a processing unit of a general-purpose computer, a special purpose computer, or other programmable data processing apparatus to produce a machine, so that an apparatus that implements functions/actions specified in one or more blocks in the flow diagrams and/or block diagrams is produced when the instructions are executed by the processing unit of the computer or other programmable data processing apparatus. The computer-readable program instructions may also be stored in the computer-readable storage medium, and the instructions enable a computer, a programmable data processing apparatus, and/or other devices to work in a specific manner, so that the computer-readable medium storing the instructions includes a manufactured product which contains instructions for implementing various aspects of the functions/actions specified in one or more blocks in the flow diagrams and/or block diagrams.

The computer-readable program instructions may also be loaded to a computer, other programmable data processing apparatus, or other devices, to execute a series of operation steps on the computer, other programmable data processing apparatus, or other devices to produce a computer-implemented process, so that the instructions executed on the computer, other programmable data processing apparatus, or other devices implement the functions/actions specified in one or more blocks in the flow diagrams and/or block diagrams.

The flow diagram and block diagrams in the accompanying drawings illustrate the architecture, functions, and operations of possible implementations of the system, method and computer program product according to the multiple embodiments of the present disclosure. In this regard, each block in the flow diagrams or block diagrams may represent a module, a program segment, or a portion of instructions, and the module, the program segment, or the portion of instructions contains one or more executable instructions for implementing a specified logical function. In some alternative implementations, the functions indicated in the blocks may also occur in a different order from that indicated in the accompanying drawings. For example, two consecutive blocks may actually be executed substantially in parallel, or sometimes in the reverse order, depending on the function involved. It should also be noted that each block in the block diagrams and/or flow diagrams, and combinations of blocks in the block diagrams and/or flow diagrams, may be implemented by a dedicated, hardware-based system that performs a specified function or operation, or may be implemented by a combination of special hardware and computer instructions.

According to the technical solution of the embodiments of the present application, traveling paths are divided into small driving environments that require traveling route judgment and straight driving environments that do not require traveling route judgment. When the vehicle arrives at a new parking lot, only a stored traveling sequence needs to be changed, without learning a parking route of the parking lot. Such a solution is simple and convenient, and easy for mass production.

It should be understood that steps may be rearranged, added or deleted by using the various forms of processes illustrated above. For example, the steps described in the present application may be executed in parallel, sequentially, or in a different order, so long as a desired result of the technical solution disclosed in the present application can be achieved, which is not limited herein.

The foregoing specific implementations do not limit the protection scope of the present application. Those skilled in the art should understand that various modifications, combinations, sub-combinations and substitutions can be made according to design requirements and other factors. All modifications, equivalent substitutions, improvements or the like made within the spirit and principle of the present application should be encompassed within the protection scope of the present application.

What is claimed is:

1. A method, comprising:
receiving, by a server, an access request from a vehicle;
obtaining, by the server based on the access request, a plurality of observation values from a plurality of stations associated with the vehicle, respectively, wherein each observation value is based on a corresponding pre-trained recommendation model, and wherein each observation value comprises factors associated with access of the vehicle to the station corresponding to the observation value, wherein, for each station of the plurality of stations, the observation value comprises a first observation value for the station and second observation values for other stations within a second distance threshold from the station, wherein, for each station of the plurality of stations, obtaining the observation value comprises:
- determining a corresponding weight for each of the second observation values according to degrees of association between the other stations and the station, wherein the plurality of stations share a same recommendation model, and differences between the plurality of stations are reflected in different observation values of the recommendation model, and wherein after one of the plurality of stations learns, the recommendation model is updated, and the updated recommendation model is applicable to the plurality of stations;
- determining, by the server, for each station of the plurality of stations, an action value for the station based on the observation value and the corresponding pre-trained recommendation model for the station, wherein the action value for the station indicates a matching degree between the access request and the station;
- determining, by the server, a recommended station among the plurality of stations based on the action values of the plurality of stations; and
- sending, by the server to the vehicle, an instruction of driving to the recommended station.

2. The method according to claim 1, wherein, for each station, the corresponding pre-trained recommendation model is trained based on a historical recommendation and a reward value corresponding to the historical recommendation.

3. The method according to claim 2, wherein the reward value is determined based on one or more of: access waiting time of the vehicle at the station, a reward threshold, expense of the vehicle at the station, a matching degree between a model of the vehicle and an accessible model for the station, station access efficiency of the station, or a score of the station provided by the vehicle.

4. The method according to claim 3, further comprising:
- obtaining a first time point as a time point of sending the instruction to the vehicle;
- determining that the vehicle accessed the recommended station within a time threshold starting from the first time point;
- obtaining a second time point that is a time point when the vehicle accessed the recommended station;
- determining the access waiting time of the vehicle at the recommended station based on the first time point and the second time point;
- determining the reward value based on the access waiting time; and
- associating the reward value with the historical recommendation.

5. The method according to claim 3, further comprising:
- obtaining a first time point as a time point of sending the instruction to the vehicle;
- determining that the vehicle did not access the recommended station within a time threshold starting from the first time point;
- determining the reward value based on the reward threshold; and
- associating the reward value with the historical recommendation.

6. The method according to claim 1, wherein the plurality of stations are stations within a first distance threshold from the vehicle.

7. The method according to claim 3, wherein the reward value is determined based on the access waiting time and a reward value associated with the first time point.

8. The method according to claim 1, wherein determining the recommended station comprises:
- determining the action value of each of the plurality of stations;
- determining a largest action value from the action values; and
- determining a station corresponding to the largest action value as the recommended station.

9. The method according to claim 1, wherein, for each station, the observation value indicates:
- a current time;
- a number of vacant access points for the station; and
- driving time from a location where the access request is sent to the station.

10. The method according to claim 9, wherein, for each station, the observation value further indicates access efficiency of the station.

11. The method according to claim 1, wherein each station of the plurality of stations is a charging station.

12. An electronic device, comprising:
- at least one processor; and
- a memory in communication with the at least one processor, wherein the memory stores instructions executable by the at least one processor to enable the at least one processor to:
  - receive an access request from a vehicle;
  - obtain, based on the access request, a plurality of observation values from a plurality of stations associated with the vehicle, respectively, wherein each observation value is based on a corresponding pre-trained recommendation model, and wherein each observation value comprises factors associated with access of the vehicle to the station corresponding to the observation value, wherein, for each station of the plurality of stations, the observation value comprises a first observation value for the station and second observation values for other stations within a second distance threshold from the station, wherein, for each station of the plurality of stations, obtaining the observation value comprises:
    - determining a corresponding weight for each of the second observation values according to degrees of association between the other stations and the station, wherein the plurality of stations share a same recommendation model, and differences between the plurality of stations are reflected in different observation values of the recommendation model, and wherein after one of the plurality of stations learns, the recommendation model is updated, and the updated recommendation model is applicable to the plurality of stations;
  - determine, for each station of the plurality of stations, an action value for the station based on the observation value and the corresponding pre-trained recommendation model for the station, wherein the action value indicates a matching degree between the access request and the station;

determine a recommended station among the plurality of stations based on the action values of the plurality of stations; and send to the vehicle an instruction of driving to the recommended station.

13. The electronic device of claim 12, wherein, for each station, the pre-trained recommendation model is trained based on a historical recommendation and a reward value corresponding to the historical recommendation.

14. The electronic device according to claim 13, wherein the reward value is determined based on one or more of: access waiting time of the vehicle at the station, a reward threshold, expense of the vehicle at the station, a matching degree between a model of the vehicle and an accessible model for the station, station access efficiency of the station, or a score of the station provided by the vehicle.

15. The electronic device according to claim 14, wherein the instructions, when executed by the at least one processor, further enable the at least one processor to:
- obtain a first time point as a time point of sending the instruction to the vehicle;
- determine that the vehicle accessed the recommended station within a time threshold starting from the first time point;
- obtain a second time point that is a time point when the vehicle accessed the recommended station;
- determine the access waiting time of the vehicle at the recommended station based on the first time point and the second time point;
- determine the reward value based on the access waiting time; and
- associate the reward value with the historical recommendation.

16. The electronic device according to claim 14, wherein the instructions, when executed by the at least one processor, further enable the at least one processor to:
- obtain a first time point as a time point of sending the instruction to the vehicle;
- determine that the vehicle did not access the recommended station within a time threshold starting from the first time point;
- determine the reward value based on the reward threshold; and
- associate the reward value with the historical recommendation.

17. The electronic device according to claim 12, wherein the plurality of stations are stations within a first distance threshold from the vehicle.

18. A non-transitory computer readable storage medium storing computer instructions, wherein the computer instructions, when executed, are configured to cause a computer to:
- receive an access request from a vehicle;
- obtain, based on the access request, a plurality of observation values from a plurality of stations associated with the vehicle, respectively, wherein each observation value is based on a corresponding pre-trained recommendation model, and wherein each observation value comprises factors associated with access of the vehicle to the station corresponding to the observation value, wherein, for each station of the plurality of stations, the observation value comprises a first observation value for the station and second observation values for other stations within a second distance threshold from the station, wherein, for each station of the plurality of stations, obtaining the observation value comprises:
  - determining a corresponding weight for each of the second observation values according to degrees of association between the other stations and the station, wherein the plurality of stations share a same recommendation model, and differences between the plurality of stations are reflected in different observation values of the recommendation model, and wherein after one of the plurality of stations learns, the recommendation model is updated, and the updated recommendation model is applicable to the plurality of stations;
- determine, for each station of the plurality of stations, an action value for the station based on the observation value and the corresponding pre-trained recommendation model for the station, wherein the action value indicates a matching degree between the access request and the station;
- determine a recommended station among the plurality of stations based on the action values of the plurality of stations; and
- send to the vehicle an instruction of driving to the recommended station.

* * * * *